(12) United States Patent
Wood et al.

(10) Patent No.: US 11,227,160 B2
(45) Date of Patent: Jan. 18, 2022

(54) DETECTING SCENE TRANSITIONS IN VIDEO FOOTAGE

(71) Applicant: INTERNATIONAL BUSINESS MACHINES CORPORATION, Armonk, NY (US)

(72) Inventors: John Jesse Wood, St. Albans (GB); Daniel Thomas Cunnington, Winchester (GB); Eunjin Lee, Eastleigh (GB); Giacomo Giuseppe Chiarella, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 16/684,747

(22) Filed: Nov. 15, 2019

(65) Prior Publication Data

US 2021/0150216 A1 May 20, 2021

(51) Int. Cl.
*G06K 9/00* (2006.01)
(52) U.S. Cl.
CPC ..... *G06K 9/00718* (2013.01); *G06K 9/00744* (2013.01)
(58) Field of Classification Search
None
See application file for complete search history.

(56) References Cited

U.S. PATENT DOCUMENTS

| 5,732,146 A | 3/1998 | Yamada et al. |
| 2010/0238632 A1 | 9/2010 | Shiraki |
| 2010/0245532 A1 | 9/2010 | Kurtz |
| 2011/0109731 A1* | 5/2011 | Koo ..................... H04N 13/128 348/51 |
| 2011/0255605 A1 | 10/2011 | Chang et al. |
| 2011/0274317 A1* | 11/2011 | Oami ................ G06K 9/00758 382/103 |
| 2011/0285904 A1* | 11/2011 | Oami ....................... H04N 5/76 348/461 |
| 2012/0128242 A1 | 5/2012 | Hampapur et al. |
| 2014/0176802 A1 | 6/2014 | Yu et al. |
| 2018/0124317 A1* | 5/2018 | Liu .................... H04N 5/23245 |
| 2019/0045217 A1* | 2/2019 | Gokhale .............. H04N 19/142 |
| 2019/0138810 A1* | 5/2019 | Chen .................... G06K 9/4628 |
| 2019/0171886 A1 | 6/2019 | Ashour et al. |
| 2019/0313103 A1* | 10/2019 | Giladi .................. H04N 19/142 |
| 2019/0364211 A1* | 11/2019 | Chun ................. H04N 21/8456 |
| 2020/0160062 A1* | 5/2020 | Cho ...................... G06T 7/0002 |
| 2020/0160699 A1* | 5/2020 | Annapureddy ........ G06K 9/628 |

(Continued)

FOREIGN PATENT DOCUMENTS

CN 106162181 A 11/2016

OTHER PUBLICATIONS

Allen et al., "Change-point Detection Methods for Body-Worn Video", arXiv:1610.06453v1, Oct. 21, 2016, pp. 1-18.

(Continued)

*Primary Examiner* — Santiago Garcia
(74) *Attorney, Agent, or Firm* — Teddi E. Maranzano

(57) ABSTRACT

Concepts for detecting a scene transition in video footage are presented. One example comprises, for each of a plurality of different frames of video footage, obtaining a value of a confidence measure associated with a detected object in the frame. A scene transition in the video footage is then detected based on the obtained values of the confidence measure.

18 Claims, 4 Drawing Sheets

(56) References Cited

U.S. PATENT DOCUMENTS

| | | | | |
|---|---|---|---|---|
| 2020/0327682 A1* | 10/2020 | Nater | ........................ | G06T 7/254 |
| 2020/0388205 A1* | 12/2020 | Bae | ........................ | G09G 3/2003 |
| 2020/0394418 A1* | 12/2020 | Liu | ........................ | G06K 9/6249 |
| 2020/0402541 A1* | 12/2020 | Talbot | .................... | G06K 9/6256 |
| 2021/0081673 A1* | 3/2021 | Lai | ........................ | G06K 9/00335 |
| 2021/0110143 A1* | 4/2021 | Bruso | ..................... | G08B 21/02 |
| 2021/0117691 A1* | 4/2021 | Shen | ........................ | G06T 7/90 |

OTHER PUBLICATIONS

Chen et al., "Video Scene Change Detection Method Using Unsupervised Segmentation and Object Tracking", 2001 EEE International Conference on Multimedia and Expo, pp. 57-60.

Github, "Reference of paper for the methods used. #62", Breakthrough/PySceneDetect, Jul. 18, 2018, 3 pages, https://github.com/Breakthrough/PySceneDetect/issues/62#issuecommen.

Github, "Video Scene Cut Detection and Analysis Tool", Latest Release: v0.5.1.1, Aug. 3, 2019, 3 pages, https://github.com/Breakthrough/PySceneDetect.

IBM, "Exceptional Video Experiences with Watson", AI Video Solutions and Services, printed Nov. 8, 2019, 4 pages, https://www.ibm.com/watson/media.

Peng, "Object Recognition in Videos Utilizing Hierarchical and Temporal Objectness with Deep Neural Networks", A dissertation submitted in partial fulfillment of the requirements for the degree of Doctor of Philosophy in Computer Science, Utah State University, 2017, 111 pages.

Redmon et al., "You Only Look Once: Unified, Real-Time Object Detection", 2016 IEEE Conference on Computer Vision and Pattern Recognition, pp. 779-788, http://pjreddie.com/yolo.

Rotman et al., "Optimally Grouped Deep Features Using Normalized Cost for Video Scene Detection", Oral Session 4, Video Analysis, ICMR'18, Jun. 11-14, 2018, pp. 187-195.

International Searching Authority, "Notification of Transmittal of the international Search Report and the Written Opinion of the International Searching Authority, or Declaration," Patent Cooperation Treaty, dated Jan. 27, 2021, 9 pages, International Application No. PCT/IB2020/0600606.

* cited by examiner

DETECTING SCENE TRANSITIONS IN VIDEO FOOTAGE

BACKGROUND

The present invention relates generally to video processing, and more particularly to detecting a scene transition in video footage.

The present invention also relates to a computer program product comprising computer-readable program code that enables a processor of a system, or a number of processors of a network, to implement such a method.

The present invention further relates to a computer system comprising at least one processor and such a computer program product, wherein the at least one processor is adapted to execute the computer-readable program code of said computer program product.

The present invention also relates to a system for detecting a scene transition in video footage.

Scene detection is a subset of video processing which provides for indexing and searching video footage. Transitions (such as 'dissolves' or 'cross-fade') between scenes cause difficulties for existing scene detection algorithms because the low-level information (e.g. color histograms, brightness, contrast) used to identify scene changes does not typically generalize well across a wide range of video footage. For example, a dissolve transition between scenes of similar contrast, brightness, color, etc. can be hard to detect.

Also, existing scene detection algorithms are typically standalone and are required to run independently from other video processing tasks. Existing scene detection methods can therefore exhibit significant processing requirements for large videos.

SUMMARY

The present invention seeks to provide a computer-implemented method for detecting a scene transition in video footage.

The present invention further seeks to provide a computer program product including computer program code for implementing a proposed method when executed by a processing unit.

The present invention also seeks to provide a processing system adapted to execute this computer program code.

The present invention also seeks to provide a system for detecting a scene transition in video footage.

According to an aspect of the present invention, there is provided a computer-implemented method for detecting a scene transition in video footage. The method comprises, for each of a plurality of different frames of video footage, obtaining a value of a confidence measure associated with a detected object in the frame. The method then further comprises detecting a scene transition in the video footage based on the obtained values of the confidence measure.

According to yet another aspect of the invention, there is provided a system for detecting a scene transition in video footage. The system comprises an interface component configured to obtain, for each of a plurality of different frames of video footage, a value of a confidence measure associated with a detected object in the frame. The system further comprises a detection component configured to detect a scene transition in the video footage based on the obtained values of the confidence measure.

According to another aspect of the invention, there is provided a computer program product for detecting a scene transition in video footage. The computer program product comprises a computer readable storage medium having program instructions embodied therewith, the program instructions executable by a processing unit to cause the processing unit to perform a method according to a proposed embodiment.

According to another aspect of the invention, there is provided a processing system comprising at least one processor and the computer program product according to an embodiment. The at least one processor is adapted to execute the computer program code of said computer program product.

BRIEF DESCRIPTION OF THE DRAWINGS

Preferred embodiments of the present invention will now be described, by way of example only, with reference to the following drawings, in which.

DETAILED DESCRIPTION

Figure 1:
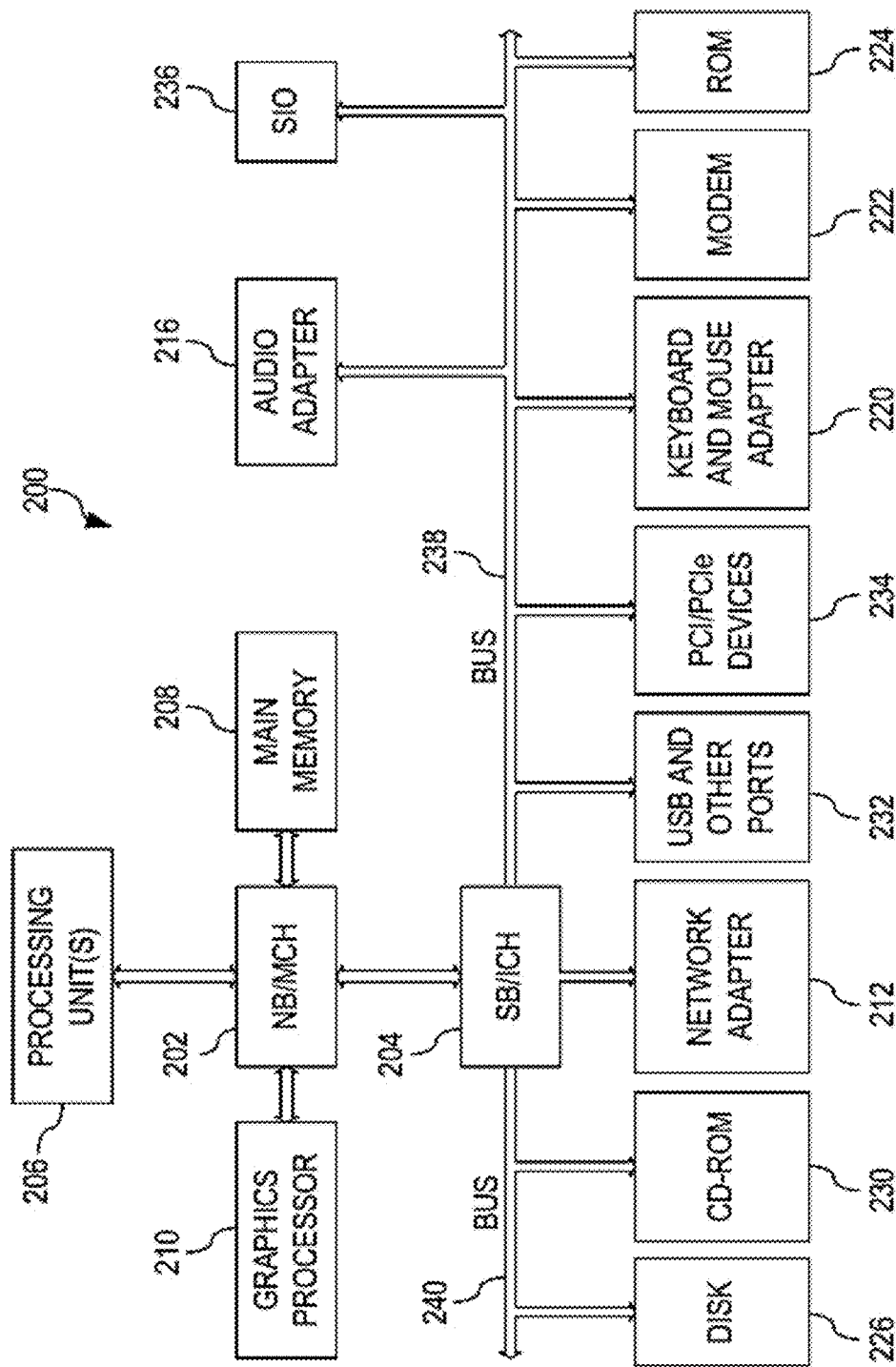
FIG. 1 is a block diagram of an example system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Concepts for detecting a scene transition in video footage are proposed. In particular, it is proposed that a scene transition in video footage may be detected based on values of a confidence measure associated with a detected object for different frames of the video footage. Put another way, changes in a confidence value for a detected object between frames of a video may be used to identify the presence of a scene transition in the video.

The inventors propose the concept of analyzing the confidence of detected objects between frames of a video so as to infer or identify the presence of a transition in the video. Proposed embodiment may thus be provided as extension to existing video processing pipelines that detect objects in video and indicate an associated confidence value.

Such proposals may remove a need for manual human tuning (which is currently a requirement for many conventional methods). By way of example, proposed embodiments may be integrated with a known cost function approach for detecting scene transitions so as to increase the robustness of that method to detect scene transitions. Embodiment may also be implemented alongside existing frame-wise object detectors.

It is proposed that values of a confidence measure associated with a detected object for different frames of the video footage may be analyzed in order to detect a scene transition in the video footage. For instance, the associated confidence scores of detected objects between frames may be compared to identify scene transitions in a relatively straight-forward manner. Unlike conventional approaches which do not account for dissolve-type scene transitions in an efficient, robust manner, embodiments may reliably detect dissolve-type scene transitions.

Proposed concepts may utilize high-level semantic information to provide an efficient scene transition detection approach, and this may enable integration with existing video processing methods/algorithms.

By way example, the inventors propose that, for each of a plurality of different frames of video footage, a value of a confidence measure associated with a detected object in the frame may be obtained. A scene transition in the video footage may then be detected based on the obtained values of the confidence measure.

Embodiments may thus provide the advantage that they are robust to dissolve transitions between scenes having similar low-level pixel information.

Another advantage that may be provided by the proposed concept(s) is that raw video frames may not need to be inspected by embodiment. Instead, embodiments may employ the output(s) of a conventional object detector. As a result, embodiments may be employed in conjunction with pre-existing video processing algorithms that are already configured to detect objects in video footage and provide confidence values associated with the detected objects. Such embodiments may therefore leverage information provided by an object detection algorithm/component, and thus supplement existing/conventional video processing algorithms/systems.

Simple integration and dynamic use of existing and/or new object detection algorithms during video processing may therefore be achieved by proposed embodiments.

Proposed embodiments may thus provide concepts for modifying and/or supplementing the functionality of video processing algorithms. For instance, embodiments may be used to integrate new or additional scene transition algorithms into existing video processing systems. Embodiments may thus help to provide improved or extended functionality to existing video processing implementations. Embodiments may therefore increase the value of a video processing system by leveraging information about detected objects in video footage to provide modified and/or extended scene transition detection functionality. Embodiments may thus help to provide improved or extended functionality to existing scene detection and/or video processing implementations.

In an embodiment, detecting a scene transition based on the obtained values of the confidence measure may comprise: analyzing the obtained values of the confidence measure to identify a trend or pattern in the values of the confidence measure over the plurality of the different frames of video footage; and identifying a scene transition in the video footage based on the identified trend or pattern in the values of confidence. For example, identifying a scene transition may comprise: comparing the identified trend or pattern in the values of confidence with a predetermined trend of pattern; and identifying a scene transition in the video footage based on the comparison result. Relatively simple data/trend analysis techniques may thus be employed by proposed embodiments, thereby minimizing the cost and/or complexity of implementation.

Further, embodiments may also classify the identified scene transition based on the identified trend or pattern in the values of confidence. Embodiments may therefore not only detect the presence of a scene transition but may also identify a type or classification of a detected scene transition. For example, a smooth, gradual reduction in a confidence value associated with a detected object over successive frames of a video may be used to infer that the scene transition is a 'dissolve' transition, whereas a sudden, step-change in confidence values associated with a detected object over successive frames of a video may be used to infer that the scene transition is a 'cut' or 'rapid fade' transition.

In some embodiments, detecting a scene transition based on the obtained values of the confidence measure may comprise: responsive to the obtained values of the confidence measure decreasing over successive frames of the video footage, determining the presence of the scene transition in the video footage. Put another way, it is proposed that as a scene is slowly faded or dissolved out as part of a transition, the values of the confidence measure associated with a detected object in the scene will also decrease in line with fading/dissolving of the scene. Relatively simple data value analysis techniques may therefore be implemented to determine the presence of the scene transition in the video footage.

In an embodiment, detecting a scene transition based on the obtained values of the confidence measure may comprise: responsive to the obtained values of the confidence measure increasing over successive frames of the video footage, determining the presence of the scene transition in the video footage. It is proposed that as a scene is slowly faded or dissolved in as part of a transition, the values of the confidence measure associated with a detected object in the scene will also increase in line with fading/dissolving-in of the scene. Again, relatively simple data value analysis techniques may therefore be implemented to determine the presence of the scene transition in the video footage.

Some embodiments may further comprise: comparing the obtained values of the confidence measure with a threshold value; and identifying at least one of a start and an end of the scene transition based on the comparison result. By way of example, identifying an end of the scene transition may comprise: determining frames of the video footage for which the obtained values of the confidence measure decrease from a value exceeding the threshold value to a value not exceeding the threshold value; and determining the end of the scene transition based on the determined frames. Similarly, identifying a start of the scene transition may comprise: determining frames of the video footage for which the obtained values of the confidence measure increase from a value not exceeding the threshold value to a value exceeding the threshold value; and determining the start of the scene transition based on the determined frames. Simple data value comparison techniques may thus be employed to accurately infer the start and/or end of a scene transition.

In some embodiments, obtaining values of a confidence measure may comprise: obtaining a first value of the confidence measure associated with the detected object in a first frame of the video footage; and obtaining a second value of the confidence measure associated with the detected object in a second, subsequent frame of the video footage. The first and second frames of the video footage may, for example, be sequential frames of the video footage.

FIG. 1 is a block diagram of an example system 200 in which aspects of the illustrative embodiments may be implemented. The system 200 is an example of a computer, such as client in a distributed processing system, in which computer usable code or instructions implementing the processes for illustrative embodiments of the present invention may be located. For instance, the system 200 may be configured to implement an interface component and a detection component according to an embodiment.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 (or, for example, the system 300 in FIG. 2). As a client, the operating system may be a commercially available operating system. An object-oriented programming system, such as the Java™ programming system, may run in conjunction with the operating system and provides calls to the operating system from Java™ programs or applications executing on system 200. Java and all Java-based trademarks and logos are trademarks or registered trademarks of Oracle and/or its affiliates.

As a server, system 200 may be, for example, an IBM® eServer™ System P5 P® system P5® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed. IBM eserver, System p5, AIX are trademarks of International Business Machines Corporation, registered in many jurisdictions worldwide. The registered trademark Linux® is used pursuant to a sublicense from the Linux Foundation, the exclusive licensee of Linus Torvalds, owner of the mark on a world-wide basis. Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

Figure 2:
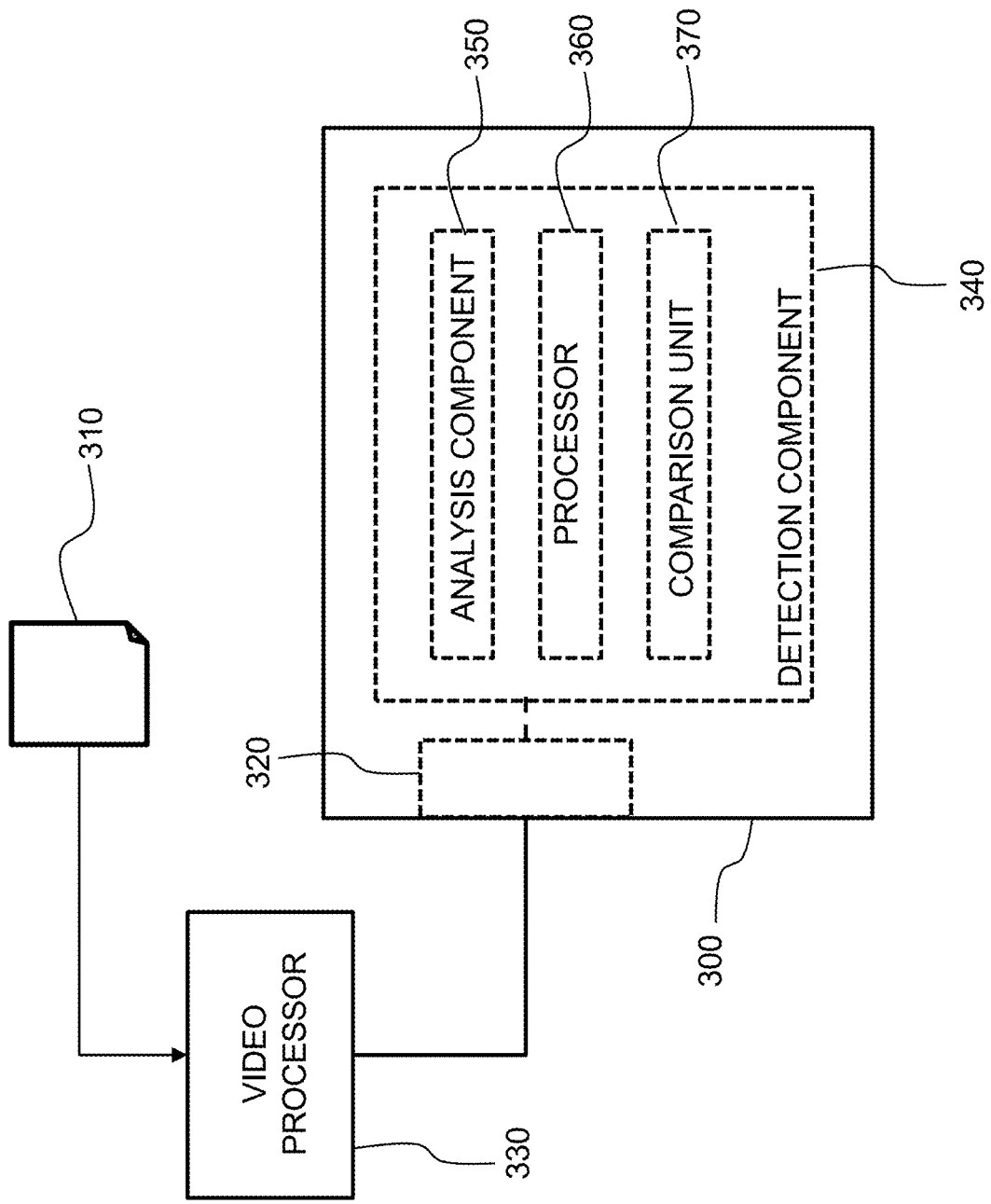
FIG. 2 is a simplified block diagram of an exemplary embodiment of a system for detecting a scene transition in video footage.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 1, may include one or more devices used to transmit and receive data. A memory may be, for example, main memory 208, ROM 224, or a cache such as found in NB/MCH 202 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Referring now to FIG. 2, there is depicted a simplified block diagram of an exemplary embodiment of system 200 (labelled system 300) for detecting a scene transition in video footage 310.

The system 200 comprises an interface component 320 configured to obtain, for each of a plurality of different frames of video footage, a value of a confidence measure (i.e. a confidence value) associated with a detected object in the frame.

In this example, the interface component 320 is configured to obtain a first value of the confidence measure associated with the detected object in a first frame of the video footage, and to obtain second value of the confidence measure associated with the detected object in a second, subsequent frame of the video footage. Put another way, the interface component 320 obtains a plurality of value of the confidence measure associated with the detected object in a respectively plurality of successive frames of the video footage.

Here, the interface component 320 obtains the confidence values from a video processor 330. The video processor 330 of this example is a conventional video processing system that is configured to process received video footage and, as a result of such processing, detect objects in the video footage and determine associated confidence values. In doing so, the video processor 330 may employ any one or more of known and available object detection algorithms that determine confidence values associated with detected objects.

The system 200 for detecting a scene transition in video footage 310 also comprises a detection component 340. The detection component 340 is configured to detect a scene transition in the video footage based on the obtained values of the confidence measure.

In the example of FIG. 2, the detection component 340 comprises an analysis component 350 and a processor 360. The analysis component 350 is configured to analyze the obtained values of the confidence measure to identify a trend or pattern in the values of the confidence measure over the plurality of the different frames of video footage. The processor 360 is then configured to identify a scene transition in the video footage based on the identified trend or pattern in the values of confidence.

Purely by way of example, responsive to the obtained values of the confidence measure decreasing over successive frames of the video footage, the processor 360 of the detection component 340 determines the presence of a scene transition in the video footage 310. The processor 360 of the detection component 340 determines the presence of a scene transition in the video footage 310, responsive to the obtained values of the confidence measure increasing over successive frames of the video footage.

In the example of FIG. 2, the detection component 340 also comprises a comparison unit 370 that is configured to compare the obtained values of the confidence measure with a threshold value. The detection component 340 is configured to identify at least one of a start and an end of the scene transition based on the comparison result obtained by the comparison unit 370. For example, to identify a start of the scene transition, the detection component 340 is configured to determine frames of the video footage for which the obtained values of the confidence measure increase from a value not exceeding the threshold value to a value exceeding the threshold value. Similarly, to identify an end of the scene transition, the detection component 340 is configured to determine frames of the video footage for which the obtained values of the confidence measure decrease from a value exceeding the threshold value to a value not exceeding the threshold value.

By way of further explanation, the concept of analyzing obtained values of the confidence measure to detect a scene transition in the video footage according to proposed embodiments will now be described with reference to another example.

The following steps (i) through (viii) describe an example of video footage wherein, a video clip (i.e. a first scene) of a dog and a cat on a sofa transitions to footage (i.e. a second scene) of a man outside with his car and motorbike. A proposed embodiment is configured to detect transition between these two scenes.

(i) Existing frame-wise Convolutional Neural Networks (CNNs) are employed to detect objects in the video footage and associated confidence values. By way of example, the detected objects and associated confidence values for first and second frames of the video footage are determined to be as detailed in Table 1 below:

TABLE 1

| Frame | Object | Location (x_min, y_min, x_max, y_max) | Confidence Value |
| --- | --- | --- | --- |
| 1 | Dog | 23, 12, 31, 24 | 90% |
| 1 | Cat | 45, 37, 54, 52 | 93% |
| 1 | Sofa | 12, 25, 40, 35 | 96% |
| 2 | Dog | 24, 9, 30, 22 | 91% |
| 2 | Cat | 47, 32, 58, 56 | 90% |
| 2 | Sofa | 12, 25, 40, 35 | 95% |

Figure 3:
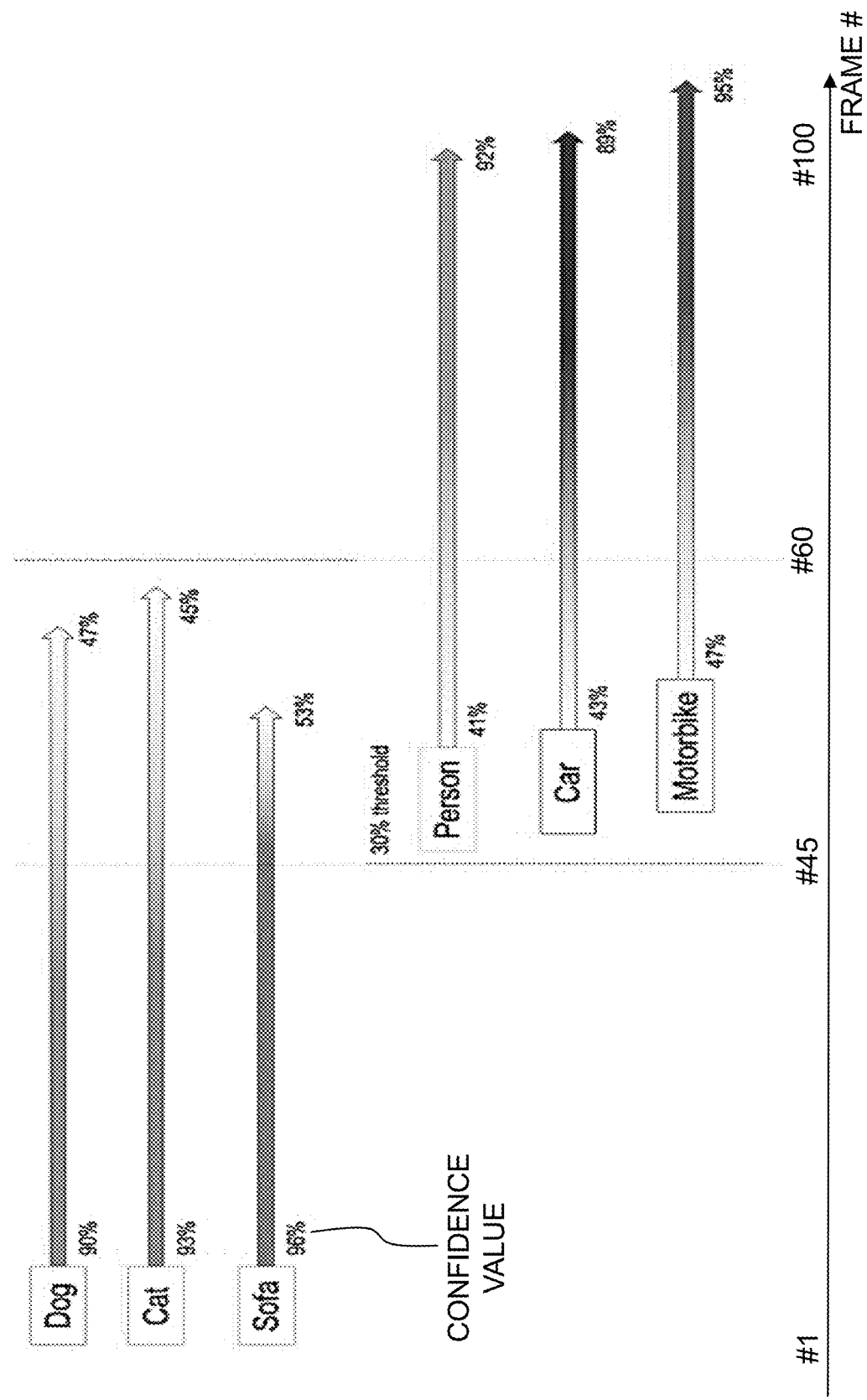
FIG. 3 depicts an example of how confidence values associated with detected objects vary between frames of video footage according to an exemplary embodiment.

(ii) Iterate over all the object detector frame results in batches using a sliding window approach, e.g. with batch size 100 and window size 5. FIG. 3 depicts an example of how the confidence values associated with detected objects vary between frames of the video footage. In the depicted example, the percentage values indicate the confidence value (i.e. value of the confidence measure) associated with a detected object for a frame of the video footage. To represent the changes in the confidence values, the arrows are depicted with varying gradient shading of grey, wherein a lighter shading represents a lower confidence value. By way of example, the confidence value associated with the detected dog decreases from the value of 90% in frame #1 down to 47% in circa frame #57. This decrease in the confidence value as the frames of the video progress is represented by the fill of the arrow varying from darker shading (for frame #1) to lighter shading (for frame #57).

(iii) Utilizing the location information provided by the output of the object detector, objects in the scene are given a unique ID and tracked frame-by-frame. Note—if multiple objects of the same type appear, a different ID is issued per object. Individual objects can be tracked using a sensible estimate for the expected movement of each object type (e.g. according to the class labels the object detector predicts). This can be computed prior to iterating over all the frames.

(iv) The confidence value associated of each unique object is monitored frame-frame as indicated by the gradient shading in FIG. 3.

(v) If a new set of objects appear (e.g. objects have an associated confidence value exceeding a threshold value of 30%) and this is matched with a simultaneous decrease in confidence of the previous objects currently on screen, it is inferred that this is indicative of the start of a dissolve transition (e.g. from Frame #45 in FIG. 3).

(vi) If the confidence of the new objects continues to increase and the confidence of the old objects continues to decrease past the 30% threshold, this point indicates the end of the dissolve transition (Frame #60 in FIG. 3).

(vii) If at any point any of the above conditions (v) & (vi) fail, the start and end positions are removed from temporary memory as a dissolve transition is not present. Note. the unique object ID information assigned may be used to determine if the same object is visible.

(viii) This process repeats for all batches of frames in the video footage.

From the above example, it will be appreciated that proposed embodiments may infer a transition from the obtained values of the confidence measures crossing a threshold value over successive frames of the video. For instance, a decrease in a confidence value associated with a first detected object which coincides or corresponds with the timing of an increase in a confidence value associated with a second detected object may indicate a dissolve transition (as depicted by the illustration in FIG. 3). Further, a start and/or end point of the transition may be identified based on the frames for which the confidence value crosses a predetermined threshold value (which may be configurable).

Figure 4:
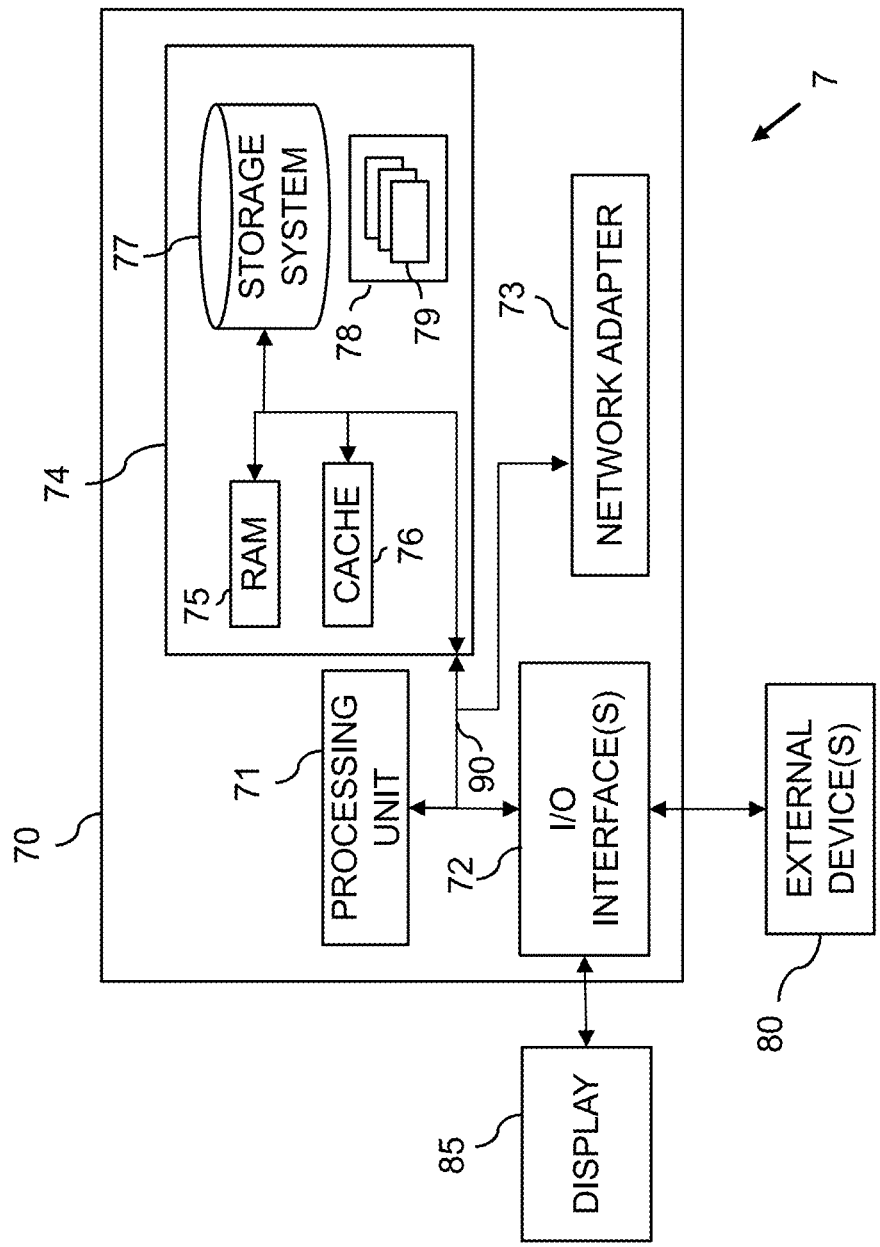
FIG. 4 is a simplified block diagram of an exemplary embodiment of a system for detecting a scene transition in video footage.

By way of further example, as illustrated in FIG. 4, embodiments may comprise a computer system 70, which may form part of a networked system 7. For instance, a system for detecting a scene transition in video footage may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform, a method for detecting a scene transition in video footage according to a proposed embodiment.

Program/utility 78, having a set (at least one) of program modules 79, may be stored in memory 74. Program modules 79 generally carry out the functions and/or methodologies of proposed embodiments for detecting a scene transition in video footage.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for detecting a scene transition in video footage, the method comprising:
    grouping the video footage into a plurality of batches of frames in a sliding window;
    processing each batch of frames, wherein the processing comprises:
    for each frame in each of the plurality of batches of frames:
        identifying each detected object in each of the plurality of different frames by a unique identifier, wherein the unique identifier is based on a spatial location of the detected object in the frame;
        obtaining a value of a confidence measure associated with the detected object in a current frame; and
        detecting a scene transition in the video footage based on a difference between the value of the confidence measure of the current frame and the value of the confidence measure of a previous frame, wherein a gradual reduction in the value of the confidence measure of the detected object over successive frames indicates a dissolve transition, and wherein a sudden change in the value of the confidence measure of the detected object over successive frames indicates a cut transition.

2. The method of claim 1, wherein identifying a scene transition comprises: comparing the identified trend or pattern in the values of confidence with a predetermined trend of pattern; and identifying a scene transition in the video footage based on the comparison result.

3. The method of claim 2, further comprising:
    classifying the identified scene transition based on the identified trend or pattern in the values of confidence.

4. The method of claim 1, wherein detecting a scene transition based on the obtained values of the confidence measure comprises:
    responsive to the obtained values of the confidence measure decreasing over successive frames of the video footage, determining the presence of a scene transition in the video footage.

5. The method of claim 1, wherein detecting a scene transition based on the obtained values of the confidence measure comprises:
    responsive to the obtained values of the confidence measure increasing over successive frames of the video footage, determining the presence of a scene transition in the video footage.

6. The method of claim 1, further comprising:
    comparing the obtained values of the confidence measure with a threshold value; and
    identifying at least one of a start and an end of the scene transition based on the comparison result.

7. The method of claim 6, wherein identifying an end of the scene transition comprises:
    determining frames of the video footage for which the obtained values of the confidence measure decrease from a value exceeding the threshold value to a value not exceeding the threshold value; and
    determining the end of the scene transition based on the determined frames.

8. The method of claim 6, wherein identifying a start of the scene transition comprises:
    determining frames of the video footage for which the obtained values of the confidence measure increase from a value not exceeding the threshold value to a value exceeding the threshold value; and
    determining the start of the scene transition based on the determined frames.

9. The method of claim 1, wherein obtaining values of a confidence measure comprises:
    obtaining a first value of the confidence measure associated with the detected object in a first frame of the video footage; and
    obtaining a second value of the confidence measure associated with the detected object in a second, subsequent frame of the video footage.

10. The method of claim 9, wherein the first and second frames of the video footage are sequential frames of the video footage.

11. A computer program product comprising a computer readable storage medium having program instructions embodied therewith, the program instructions executable by a processing unit to cause the processing unit to perform, when run on a computer network, a method for detecting a scene transition in video footage, wherein the method comprises the steps of:
grouping the video footage into a plurality of batches of frames in a sliding window;
processing each batch of frames, wherein the processing comprises:
for each frame in each of the plurality of the batches of frames:
identifying each detected object in each of the plurality of different frames by a unique identifier, wherein the unique identifier is based on a spatial location of the detected object in the frame;
obtaining a value of a confidence measure associated with the detected object in a current frame; and
detecting a scene transition in the video footage based on a difference between the confidence measure of the current frame and the value of the confidence measure of a previous frame, wherein a gradual reduction in the value of the confidence measure of the detected object over successive frames indicates a dissolve transition, and wherein a sudden change in the value of the confidence measure of the detected object over successive frames indicates a cut transition.

12. A system for detecting a scene transition in video footage, the system comprising one or more processors and one or more tangible storage media storing programming instructions for execution by the one or more processors, the programming instructions comprising instructions for:
grouping the video footage into a plurality of batches of frames in a sliding window;
processing each batch of frames, wherein the processing comprises:
identifying each detected object in each frame by a unique identifier, wherein the unique identifier is based on a spatial location of the detected object in the frame;
obtaining via an interface, for each frame in each of the plurality of the batches of frames, a value of a confidence measure associated with the detected object in a current frame; and
detecting a scene transition in the video footage based on a difference between the value of the confidence measure of the current frame and the value of the confidence measure of a previous frame.

13. The system of claim 12 wherein the detecting comprises:
responsive to the obtained values of the confidence measure decreasing over successive frames of the video footage, determine the presence of the scene transition in the video footage.

14. The system of claim 12, wherein the detecting comprises:
responsive to the obtained values of the confidence measure increasing over successive frames of the video footage, determine the presence of the scene transition in the video footage.

15. The system of claim 12, wherein the detecting comprises:
comparing the obtained values of the confidence measure with a threshold value; and
identifying at least one of a start and an end of the scene transition based on the comparison result.

16. The system of claim 15, wherein identifying a start of the scene transition comprises:
determining frames of the video footage for which the obtained values of the confidence measure increase from a value not exceeding the threshold value to a value exceeding the threshold value; and
determining the start of the scene transition based on the determined frames.

17. The system of claim 12, wherein obtaining value of a confidence measure comprises:
obtaining a first value of the confidence measure associated with the detected object in a first frame of the video footage; and
obtaining a second value of the confidence measure associated with the detected object in a second, subsequent frame of the video footage.

18. The method of claim 1, further comprising:
detecting a new object in the frames of the sliding window, wherein the new object has an associated confidence value exceeding a threshold;
simultaneously detecting a decrease in value of the confidence measure of previously detected objects, thereby indicating a start of a dissolve scene transition; and
indicating an end of the dissolve scene transition, based on the confidence measure of previously detected objects decreasing past the threshold.

* * * * *